US008707752B2

(12) United States Patent
Radke et al.

(10) Patent No.: US 8,707,752 B2
(45) Date of Patent: *Apr. 29, 2014

(54) COMPOSITE MATERIALS AND CALIBRATION ASSEMBLIES USING THE SAME

(71) Applicant: Schlumberger Technology Corporation, Sugar Land, TX (US)

(72) Inventors: Richard J. Radke, Pearland, TX (US); Christopher Scott Del Campo, Houston, TX (US); Dale Wayne Clinton, Sugar Land, TX (US); Qingyan He, Pearland, TX (US); Augdon John Sampa, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,897

(22) Filed: Dec. 4, 2012

(65) Prior Publication Data

US 2013/0091922 A1    Apr. 18, 2013

Related U.S. Application Data

(63) Continuation of application No. 12/603,902, filed on Oct. 22, 2009, now Pat. No. 8,327,683.

(60) Provisional application No. 61/145,862, filed on Jan. 20, 2009.

(51) Int. Cl.
   *G01D 18/00*    (2006.01)
(52) U.S. Cl.
   USPC ............................................ 73/1.01

(58) Field of Classification Search
   USPC ................................................. 73/1.01, 1.86
   See application file for complete search history.

(56) References Cited

U.S. PATENT DOCUMENTS

| 3,122,636 | A | 2/1964 | Fryer |
| 3,215,837 | A | 11/1965 | Hall, Jr. et al. |
| 4,378,498 | A | 3/1983 | Givens |
| 4,838,070 | A | 6/1989 | Bradley |
| 7,357,014 | B2 | 4/2008 | Vaccaro et al. |
| 7,373,991 | B2 | 5/2008 | Vaidya et al. |
| 7,455,106 | B2 | 11/2008 | Veneruso et al. |
| 7,604,049 | B2 | 10/2009 | Vaidya et al. |
| 7,631,697 | B2 | 12/2009 | Bhavsar |
| 8,327,683 | B2 * | 12/2012 | Radtke et al. .................. 73/1.01 |
| 2004/0050140 | A1 | 3/2004 | Palmer et al. |

FOREIGN PATENT DOCUMENTS

| CN | 1559011 A | 12/2004 |
| SU | 785828 A1 | 12/1980 |

* cited by examiner

*Primary Examiner* — Peter Macchiarolo
*Assistant Examiner* — Tamiko Bellamy
(74) *Attorney, Agent, or Firm* — Kenneth Liu

(57) ABSTRACT

A calibration assembly is disclosed. In one embodiment, a calibration assembly calibrating a downhole formation evaluation tool includes a calibration base having a first geometry, a calibration insert including a first material and having a second geometry, and a second material having a third geometry and being different from the first material. The second geometry enables the calibration insert to receive the second material to form a first composite region, wherein the first and second materials and the second and third geometries are selected such that a calibration property of the calibration assembly apparatus substantially matches a corresponding calibration property of a third material. Additional apparatuses, devices, and methods are also disclosed.

20 Claims, 10 Drawing Sheets

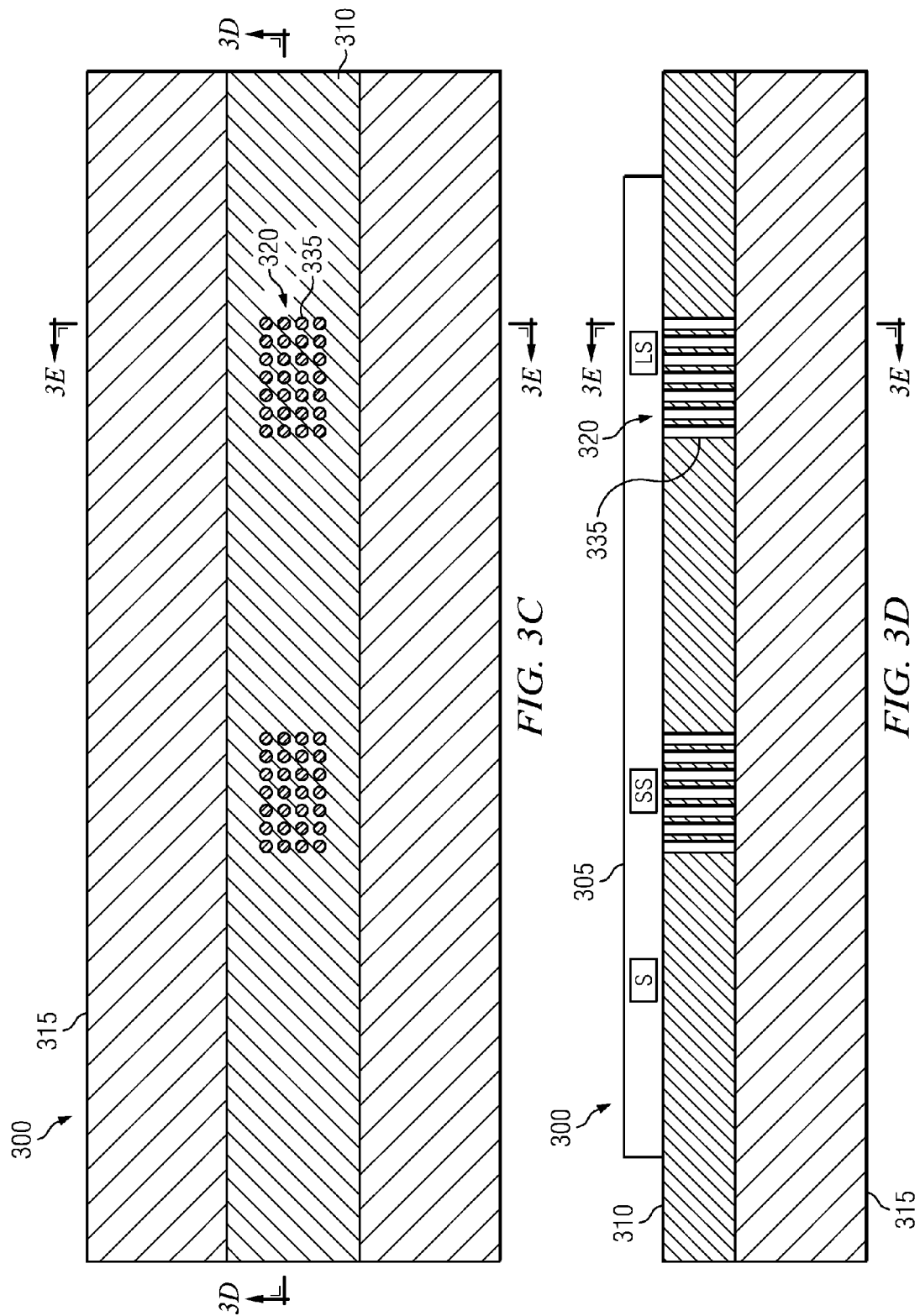

COMPOSITE MATERIALS AND CALIBRATION ASSEMBLIES USING THE SAME

CROSS-REFERENCE TO RELATED APPLICATION

This application is a continuation of U.S. patent application Ser. No. 12/603,902, entitled "Composite Materials And Calibration Assemblies Using The Same" and filed Oct. 22, 2009, which claims benefit from U.S. Provisional Patent Application Ser. No. 61/145,862, entitled "Composite Materials for Logging Tool Calibration," and filed Jan. 20, 2009, all of which are hereby incorporated by reference in their entirety.

BACKGROUND

Wellbores may be drilled to, for example, locate and produce hydrocarbons. During a drilling operation, it may be desirable to evaluate and/or measure properties of encountered formations, formation fluids and/or formation gasses. In some cases, a drillstring is removed and a wireline tool deployed into the wellbore to test, evaluate and/or sample the formation(s), formation gas(ses) and/or formation fluid(s). In other cases, the drillstring may be provided with devices to test and/or sample the surrounding formation(s), formation gas(ses) and/or formation fluid(s) without having to remove the drillstring from the wellbore.

Calibration may be required to improve the accuracy of such downhole formation evaluation tools. A calibration procedure may involve placing the tool in one or more standard environments having known characteristics and/or parameters, recording measurements taken by one or more sensors of the tool within the standard environment, and relating the measurements to one or more reference measurements. By calibrating a tool, measurement differences that arise from the tolerances and/or variations in the components used to implement the tool may be reduced and/or substantially eliminated.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 3A-3E depict an example calibration assembly according to one or more aspects of the present disclosure.

DETAILED DESCRIPTION

Figure 1:
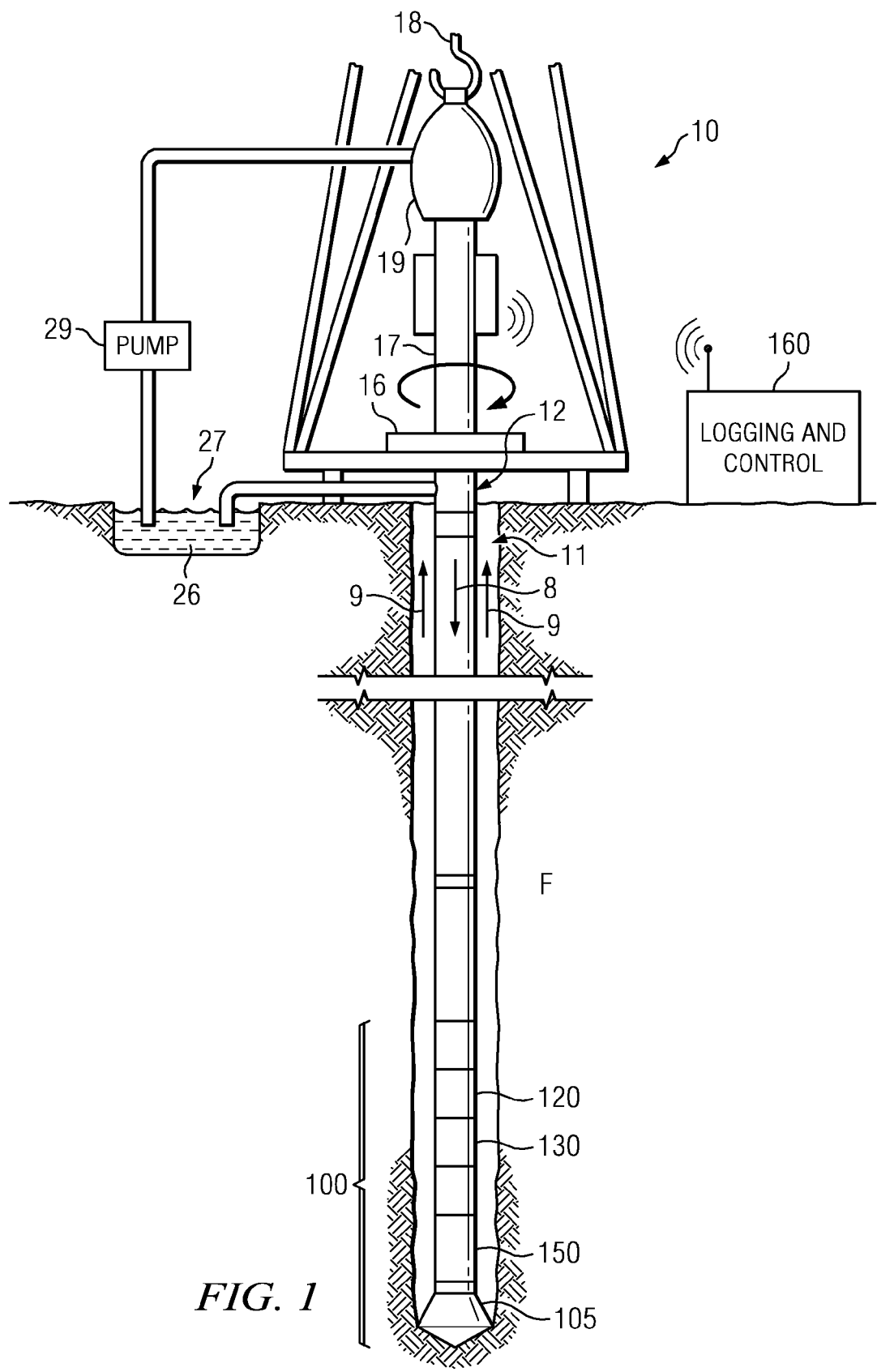
FIG. 1 depicts a partial cross-sectional view of an example wellsite drilling system including a downhole module that may be calibrated according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

To accurately calibrate downhole tools, the tolerances and/or variations in a standardized calibration environment should be small relative to those of the calibrated tool. This may be difficult to achieve. The calibration environment may include one or more calibration materials such as an aluminum alloy, which have properties that may be measured by the tool and which may then be used to calibrate the tool. Because the calibration materials conventionally used to calibrate tools may vary from batch to batch and/or from sample to sample, calibrations performed using such materials may lead to inaccurate results. Moreover, calibration materials having property values that are adequately controlled may not have those properties over a sufficient range of values. As used herein, a calibration material is any material such as an alloy having substantially known properties that are measured by a tool and then used to adjust, set and/or otherwise calibrate one or more components, devices, elements and/or computations of the tool.

To overcome at least these deficiencies, the present disclosure describes composite materials that may be used to emulate and/or mimic the properties of other materials, and calibration assemblies constructed using the same. Disclosed example composite materials combine and/or assemble two or more different materials, which each may have well-controlled and/or well-known properties, to form a composite material having properties with adequate precision over a desired range. The composite material may be implemented through machining, laminating and/or assembly processes rather than by the alloying processes used in a mill to form alloys. Because the materials used to form the composite may be selected from substantially pure materials (e.g., aluminum and/or titanium), which have properties that vary insignificantly from batch to batch, the resulting composite materials may be reliably, repeatedly and/or consistently formed to have the intended and/or required tight tolerances and small parameter variations. The type and/or arrangement of materials may be selected and/or adjusted to yield a composite material having a desired range of properties. The composite materials described herein may be used to mimic and/or emulate the properties of different materials, including calibration alloys and/or calibration materials used to calibrate downhole formation evaluation tools. However, composite materials according to one or more aspects of the present disclosure, whether or not they are used to construct calibration assemblies, need not be designed, intended and/or selected to mimic and/or emulate the property(-ies) of other materials. Example properties that may be emulated according to one or more aspects of this disclosure include, but are not limited to, an electron density, an effective atomic number, and/or a photoelectric factor (Pe).

While example composite materials that may be used to emulate the properties of aluminum alloys are described herein, it should be understood that composite materials may be formed according to one or more aspects of the present disclosure that emulate other types of materials and/or alloys, metal and/or otherwise. Further, any number and/or type(s) of materials such as metal(s), alloy(s) (metal and/or otherwise), plastic(s), fluid(s) and/or ceramic(s) may be used to form composite materials according to one or more aspects of the present disclosure. Moreover, while calibration assemblies including composite materials that may be used to calibrate downhole formation evaluation tools are described herein, it should be understood that composite materials according to one or more aspects of the present disclosure may, additionally or alternatively, be used to replace materials in other applications.

FIG. 1 depicts a partial cross-sectional view of an example wellsite drilling system that can be employed onshore and/or offshore. In the example wellsite system of FIG. 1, a borehole 11 is formed in one or more subsurface formations F by rotary and/or directional drilling. In the illustrated example of FIG. 1, a drillstring 12 is suspended within the borehole 11 and has a bottom hole assembly (BHA) 100 having a drill bit 105 at its lower end. A surface system includes a platform and derrick assembly 10 positioned over the borehole 11. The assembly 10 may include a rotary table 16, a kelly 17, a hook 18 and/or a rotary swivel 19. The drillstring 12 may be rotated by the rotary table 16, energized by means not shown, which engages the kelly 17 at the upper end of the drillstring 12. The example drillstring 12 may be suspended from the hook 18, which may be attached to a traveling block (not shown), and through the kelly 17 and the rotary swivel 19, which permits rotation of the drillstring 12 relative to the hook 18. Additionally or alternatively, a top drive system may be used.

In the example of FIG. 1, the surface system may also include drilling fluid 26, which is commonly referred to in the industry as mud, stored in a pit 27 formed at the well site. A pump 29 may deliver the drilling fluid 26 to the interior of the drillstring 12 via a port (not shown) in the swivel 19, causing the drilling fluid to flow downwardly through the drillstring 12 as indicated by the directional arrow 8. The drilling fluid 26 may exit the drillstring 12 via ports in the drill bit 105, and then circulate upwardly through the annulus region between the outside of the drillstring 12 and the wall of the borehole, as indicated by the directional arrows 9. The drilling fluid 26 may be used to lubricate the drill bit 105, carry formation cuttings up to the surface as it is returned to the pit 27 for recirculation, and/or create a mudcake layer (not shown) on the walls of the borehole 11.

The example BHA 100 of FIG. 1 may include, among other things, any number and/or type(s) of downhole logging tools, such as a logging-while-drilling (LWD) module 120 and/or a measuring-while-drilling (MWD) module 130, a rotary-steerable system or mud motor 150, and/or the example drill bit 105.

The example LWD module 120 of FIG. 1 is housed in a special type of drill collar, as it is known in the art, and may contain any number and/or type(s) of logging tool(s), formation evaluation tool(s), and/or fluid sampling device(s). The example LWD module 120 may include capabilities for measuring, processing, and/or storing information, as well as for communicating with the MWD module 130 and/or directly with surface equipment, such as a logging and control computer 160.

The example MWD module 130 of FIG. 1 is also housed in a special type of drill collar and contains one or more devices for measuring characteristics of the drillstring 12 and/or the drill bit 105. The example MWD tool 130 may also include an apparatus (not shown) for generating electrical power for use by the downhole system 100. Example devices to generate electrical power include, but are not limited to, a mud turbine generator powered by the flow of the drilling fluid, and a battery system. Example measuring devices include, but are not limited to, a weight-on-bit measuring device, a torque measuring device, a vibration measuring device, a shock measuring device, a stick slip measuring device, a direction measuring device, and an inclination measuring device. The MWD module 130 may also include capabilities for communicating with surface equipment, such as the logging and control computer 160, using any past, present or future two-way telemetry system such as a mud-pulse telemetry system, a wired drill pipe telemetry system, an electromagnetic telemetry system and/or an acoustic telemetry system.

Figure 2:
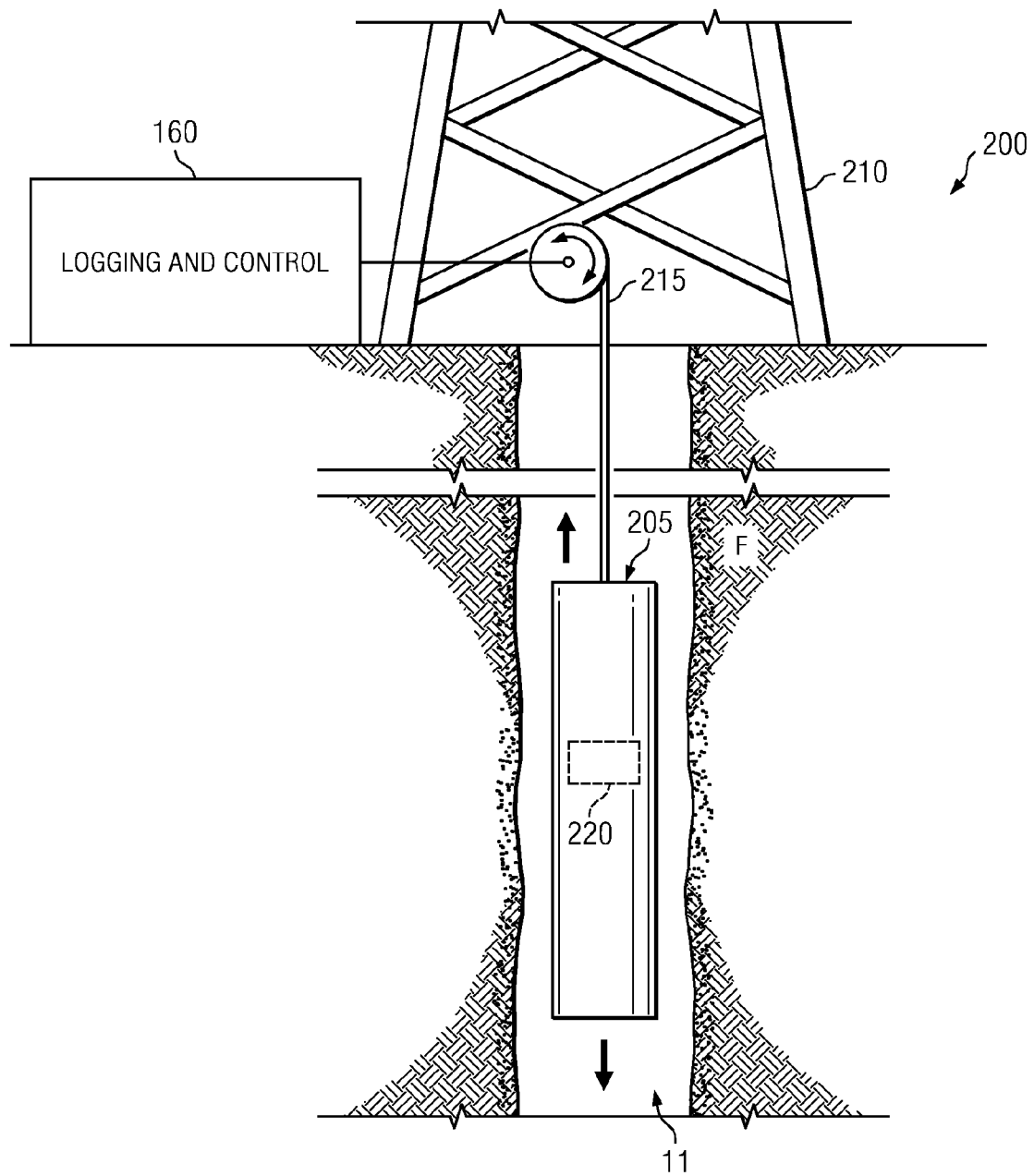
FIG. 2 depicts a partial cross-sectional view of an example wellsite wireline system including a downhole module that may be calibrated according to one or more aspects of the present disclosure.

FIG. 2 depicts a partial cross-sectional view of an example wellsite wireline formation evaluation system that can be employed onshore and/or offshore. In the illustrated of FIG. 2, a downhole wireline tool 205 is suspended from a rig 210 in the wellbore 11 formed in the geologic formation F. The example tool 205 of FIG. 2 is deployed from the rig 210 into the wellbore 11 via a wireline cable 215 and may be positioned within and/or moved through any particular portion of the geologic formation F. The portion(s) of the wellbore 11 to be tested may have been perforated using any number and/or type(s) of method(s) such as explosive charges. As the example wireline tool 205 operates, outputs of any number and/or type(s) of formation evaluation modules (one of which is designated at reference numeral 220) may be sent via, for example, telemetry to the logging and control computer 160 and/or may be stored in any number and/or type(s) of memory (-ies) for subsequent recall and/or processing.

The example modules 120, 130 and/or 220 of FIGS. 1 and 2 may implement any number and/or type(s) of formation evaluation sensor(s), module(s) and/or tool(s) including, but not limited to, a density measurement tool, a photoelectric factor measurement tool, a neutron porosity tool, a pulsed-neutron tool, an acoustic tool, an electromagnetic tool and/or a magnetic resonance tool. The example tools 120, 130 and/or 220 may be calibrated using any of the alloy emulating composites and/or calibration assemblies described herein, and/or may be calibrated using calibration alloys.

While drillstring and wireline tools 120, 130 and 220 are shown in FIGS. 1 and 2, the composite materials described herein may be used to calibrate any number and/or type(s) of additional or alternative tools regardless of conveyance type and/or articulation method. Other example tools include, but are not limited to, a slickline tool, a memory logging tool, and a logging-while tripping tool. Additionally or alternatively, pad-type and/or mandrel-type tools may also be calibrated with the composite materials disclosed herein. These lists are not meant to be all-inclusive but are intended to illustrate that aspects of the present disclosure may be used to calibrate a wide variety of tools.

FIGS. 3A-3E depicts an example calibration assembly 300 that may be used to calibrate any of the example downhole tools 120, 130 and 220 of FIGS. 1 and 2. While any of the example downhole tools 120, 130 and 220 may be calibrated using the example calibration assembly 300 of FIGS. 3A-3E, for ease of discussion, the tool of FIGS. 3A-3E will be referred to as downhole tool 305. The example calibration assembly 300 of FIGS. 3A-3E includes a calibration insert 310 and a calibration base and/or block 315. The example calibration insert 310 of FIG. 3 may include one or more composite materials and/or composite material regions, one of which is designated at reference numeral 320, configured to mimic and/or emulate one or more properties of a calibration alloy and/or calibration material.

Figure 3A:
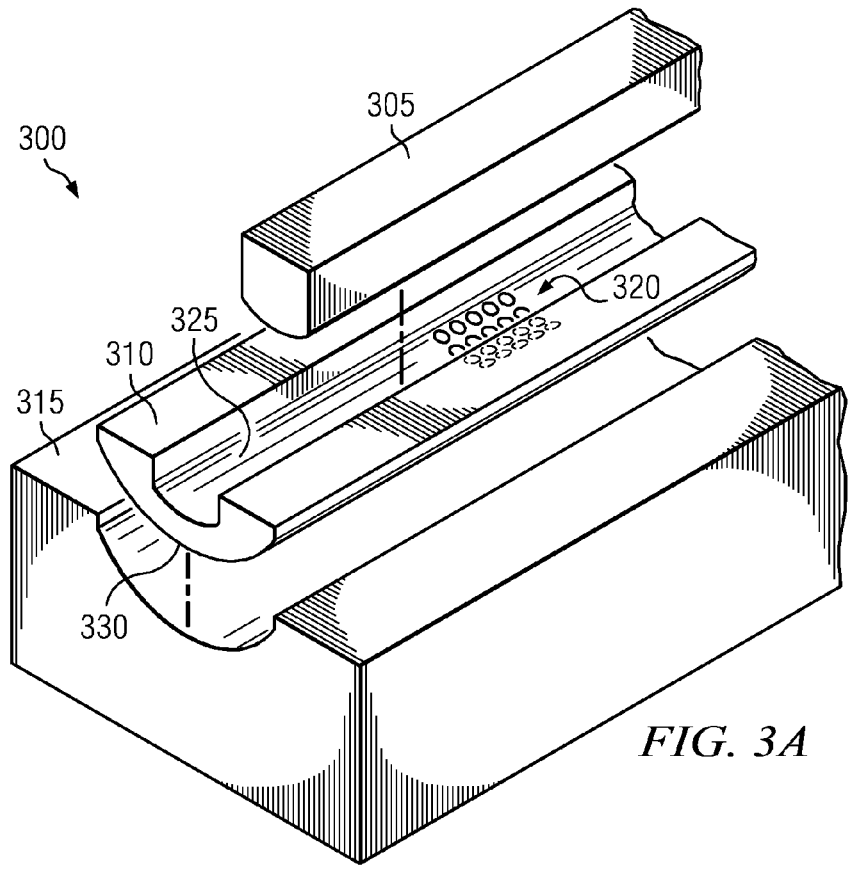
Figure 3B:
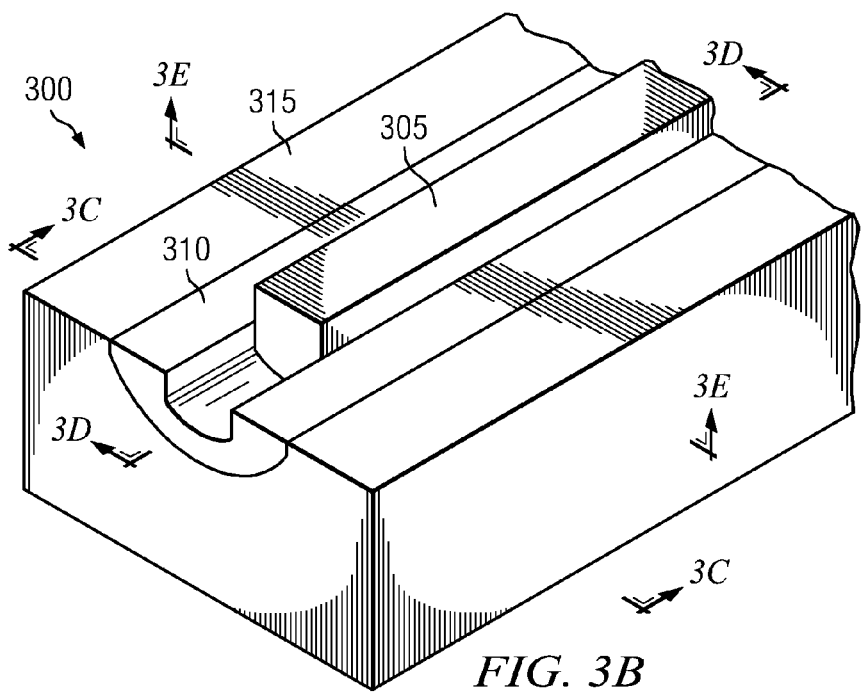
Figure 3E:
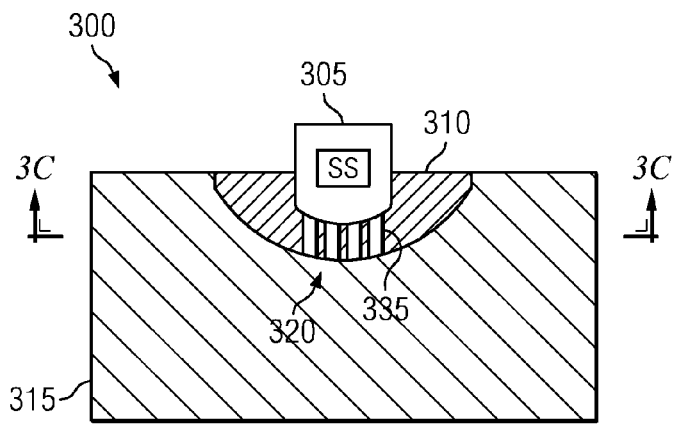

FIG. 3A depicts an exploded view of the example calibration assembly 300. FIG. 3C is a top cross-sectional view of the example calibration assembly 300 taken along line 3C-3C of FIGS. 3B and 3E. FIG. 3D is a side cross-sectional view of the example calibration assembly 300 taken along line 3D-3D of FIG. 3B. FIG. 3E is another side cross-sectional view of the example calibration assembly 300 taken along line 3E-3E of FIGS. 3B, 3C and 3D.

The example calibration block 315 of FIGS. 3A-3E is dimensioned, formed and/or machined to accept and/or receive the calibration insert 310. The example calibration block 315 may also be configured to isolate the example downhole tool 305 from signals present in the environment and/or to prevent signals transmitted and/or radiated by the downhole tool 305 during calibration from radiating from the calibration assembly 300 into the surrounding environment. Use of the calibration block 315 may also permit the calibration insert 310 to be thinner than might otherwise be required. The calibration block 315 may be formed from aluminum.

The example calibration insert 310 of FIGS. 3A-3E has an interior surface 325 configured and/or shaped to receive a particular downhole tool type. The interior surface 325 is dimensioned, formed and/or machined to correspond to a particular type, shape and/or dimensioned downhole tool 305. The example calibration insert 310 has an exterior surface 330 configured to correspond to the shape and/or contour of the calibration block 315. Accordingly, the example calibration insert 310 enables the generically formed calibration block 315 to be used during the calibration of any number and/or type(s) of downhole tools 305 having different dimensions and/or shapes. In other words, calibration inserts 310 having differently contoured or shaped interiors may be used to enable differently shaped tools 305 to be calibrated using the same calibration block 315. The use of calibration inserts 310 also enables different measurements and/or sensors of the downhole tool 305 or other tools to be calibrated using the same calibration block 315. The example calibration insert 310 of FIGS. 3A-3E may be formed from a substantially pure metal such as aluminum, an alloy, a calibration alloy, a calibration material and/or may contain one or more of the example composite material regions 320. The use of an alloy and/or composite material may enable a broader range of material properties than a substantially pure metal.

The example downhole tool 305 of FIGS. 3A-3E includes a signal source and/or transmitter S. The example downhole tool 305 also includes a short-spaced detector and/or sensor SS and a long-spaced detector and/or sensor LS, which is further from the source S than the sensor SS. The example source S may transmit gamma rays, and the sensors SS and LS may detect gamma rays. Using any number and/or type(s) of method(s), algorithm(s) and/or calculation(s), the apparent density, the bulk density, and/or the photoelectric factor of the calibration assembly 300 may be determined using gamma ray measurements taken by the sensors SS and LS. While a particular downhole tool 305 having the source S and the sensors SS and LS is depicted in FIGS. 3A-3E, it should be apparent that calibration assemblies according to one or more aspects of the present disclosure may be used to calibrate downhole tools having any number and/or type(s) of additional and/or alternative sources and/or sensors.

Because, as discussed above, substantially pure metals and alloys may have disadvantages for calibrating downhole tools, the example calibration insert 310 of FIGS. 3A-3E includes the example composite material region(s) 320. While in the example illustrated in FIGS. 3A-3E the composite material region(s) 320 are located in close proximity to the sensors SS and LS, additionally and/or alternatively, larger portions of the calibration insert 310 may comprise composite materials. For example, the composite material regions 320 may be dimensioned to extend beyond the dimensions of the sensors SS and LS to accommodate misalignment of the downhole tool 305 and the calibration insert 310. Moreover, while the example composite materials and/or composite material region(s) 320 of FIGS. 3A-3E are substantially identical, the calibration assembly 300 may include any number and/or type(s) of additional and/or alternative composite materials and/or composite material regions.

The example calibration insert 310 of FIGS. 3A-3E comprises substantially pure aluminum into which a plurality of substantially pure titanium pins and/or cylinders, one of which is designated at reference numeral 335, are inserted, adhered and/or press fit. As shown, the example titanium pins 335 may be arranged in a substantially equidistant rectangular array to form a composite material or material region. The diameter and spacing of the titanium pins 335 may be selected to emulate the property(-ies) of a particular material and/or alloy, and/or to implement a composite material having one or more desired calibration properties. Additionally, the diameter and/or spacing of the pins may additionally be selected so that the example sensors SS and LS sense the pin array 320 as a composite material rather than as its constituent components. An example composite material 320 may be titanium pins having a diameter of 5/16 inches (approximately 0.794 centimeters) that are spaced about 0.424 inches (approximately 1.077 centimeters) apart center-to-center.

While not shown in FIGS. 3A-3E, the example calibration assembly 300 may include any number and/or type(s) of additional elements that position and/or retain the calibration insert 310 within the calibration block 315, position and/or retain the downhole tool 305 within the calibration insert 310, and/or facilitate carrying or otherwise transporting the calibration insert 310. Further, a material (e.g., a cover) may be placed on top of the calibration insert 310 and the downhole tool 305 to reduce and/or substantially prevent the presence of water and/or moisture between the calibration insert 310 and the downhole tool 305. Such water and/or moisture could lead to inaccurate calibration. There may also be dams on either end of the calibration block 315 to prevent any water that may surround the calibration block 315 from seeping between and/or on top of the calibration insert 310 and/or the downhole tool 305.

The example calibration insert 310 of FIGS. 3A-3E may be formed from a blank and/or block of substantially pure aluminum by drilling rectangular grids of holes into which the example titanium pins 335 are pressed and/or inserted. The aluminum blank with the pins 335 inserted may then be milled and/or machined to form the geometry illustrated in FIGS. 3A-3E. Alternatively, the aluminum blank may be milled and/or machined prior to the holes being drilled and/or the titanium pins 335 being inserted.

Figure 4A:
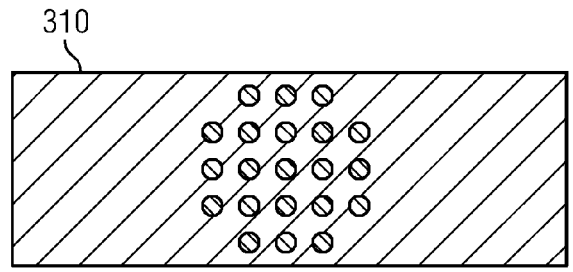
FIGS. 4A-8B depict other example composite materials according to one or more aspects of the present disclosure.
Figure 4B:
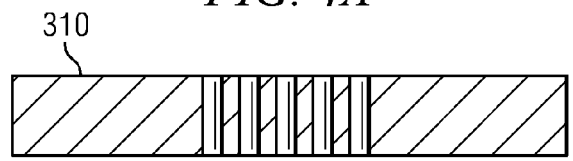
Figure 5A:
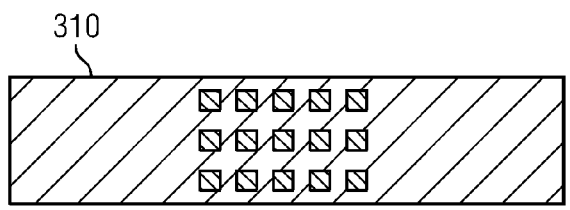
Figure 5B:
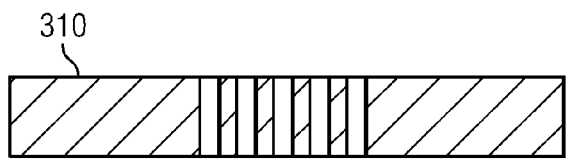

While the example composite material(s) and/or material region(s) 320 of FIGS. 3A-3E comprise pin arrays, composite materials may be formed from materials having other dimensions and/or geometries. For example, as shown in the top and side cross-sectional views of FIG. 4A and FIG. 4B, respectively, cylindrical pins may be arranged in a hexagonal-shaped array. As shown in the top and side cross-sectional views of FIG. 5A and FIG. 5B, respectively, rectangular or square pins rather than cylindrical pins may be used.

Figure 6A:
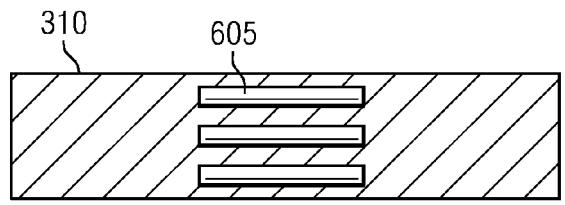
Figure 6B:
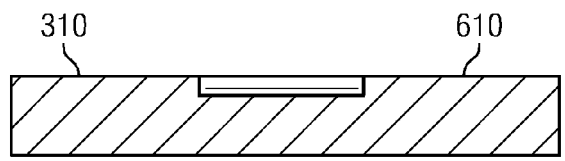
Figure 7A:
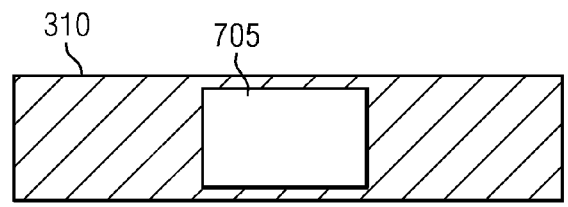
Figure 7B:
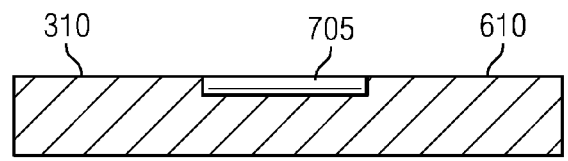
Figure 8A:
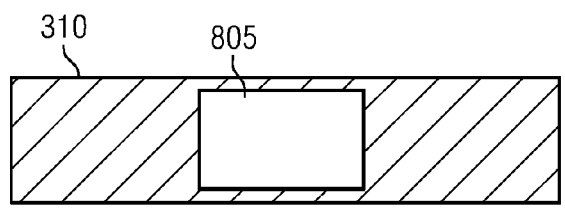
Figure 8B:
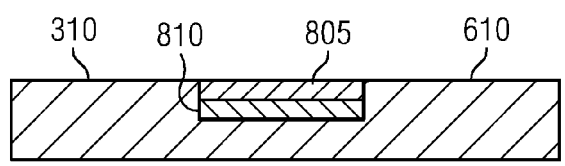

As shown in the cross-sectional views of FIGS. 6A, 6B, 7A, 7B, 8A and 8B, composite materials may be formed by embedding one or more materials into a surface of the calibration insert 310. In the example of FIGS. 6A and 6B, parallel bars of a first material such as titanium, one of which is designated at reference numeral 605, are embedded into the top surface 610 of the calibration insert 310. In the example of FIGS. 7A and 7B, a rectangular-shaped piece 705 of a first material such as titanium is embedded into the top surface 610 of the calibration insert 310. In the example of FIGS. 8A and 8B, a laminate of two pieces 805 and 810 of different materials are embedded into the top surface 610 of the calibration insert 310.

As shown in FIGS. 3A-3E, 4A, 4B, 5A, 5B, 6A, 6B, 7A, 7B, 8A, 8B, any number and/or type(s) materials having different dimensions and/or geometries may be combined and/or assembled to form composite materials. In general, materials, dimensions and/or geometries are selected based on any number of criteria. Example criteria include, but are not limited to, manufacturability, sensitivity of the downhole tool 305 to signals of different wavelengths, potential for corrosive material interactions, tolerance of materials to surface treatments such as anodization, availability of materials, intolerance to misalignment of the downhole tool 305 and the calibration insert 310, and/or the extent to which the composite material may be sensed, measured and/or characterized as a composite rather than as its constituent parts. Material and/or geometry selections may identified based on knowledge of well-known material properties and may then be evaluated using modeling and/or simulation tools to confirm and/or adjust material and/or geometry selections.

Composite materials may, additionally or alternatively, be formed using materials other than metals and/or metal alloys. For example, composite materials may be formed from any combination(s) of metal(s), alloy(s), ceramic(s), plastic(s), and/or fluid(s) such as water or oil. In general, materials may be selected based on the type(s) of test(s) that the downhole tool 305 is intended to perform. For example, metal materials may be appropriate for density measurements, hydrogenous materials such as plastics or water may be appropriate for neutron porosity tools, and/or combinations of metals and plastics for electromagnetic and/or acoustic tools.

Figure 9A:
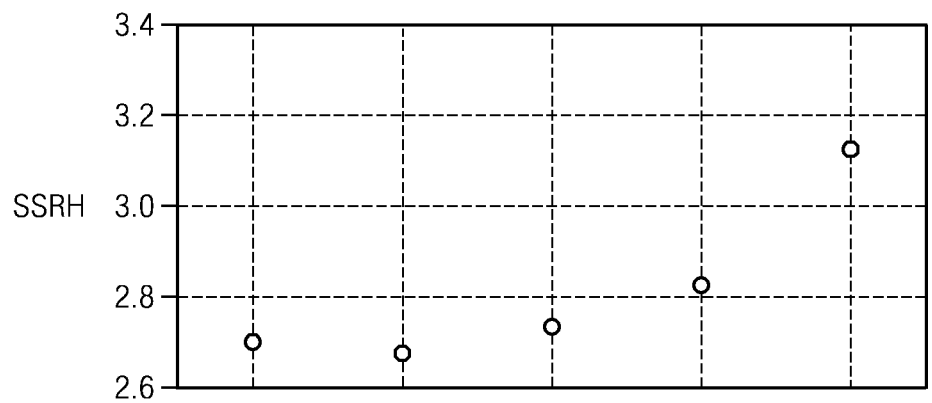
FIGS. 9A-9F and 10A-10F depict example emulation properties of composite materials according to one or more aspects of the present disclosure.
Figure 9B:
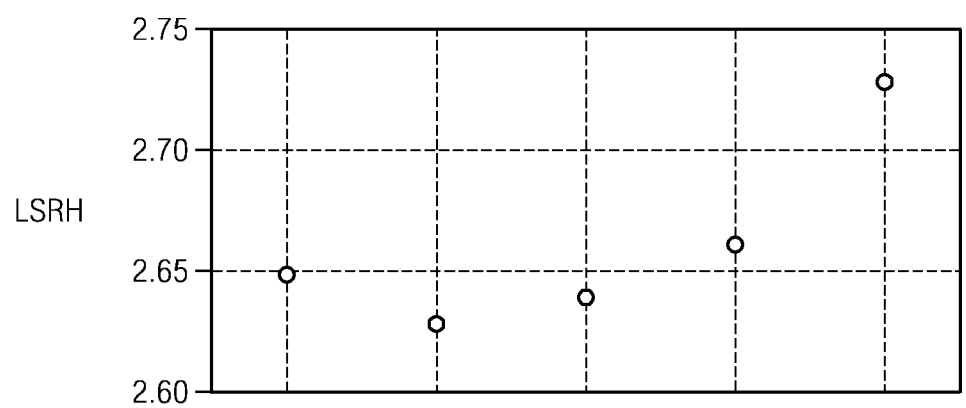
Figure 9C:
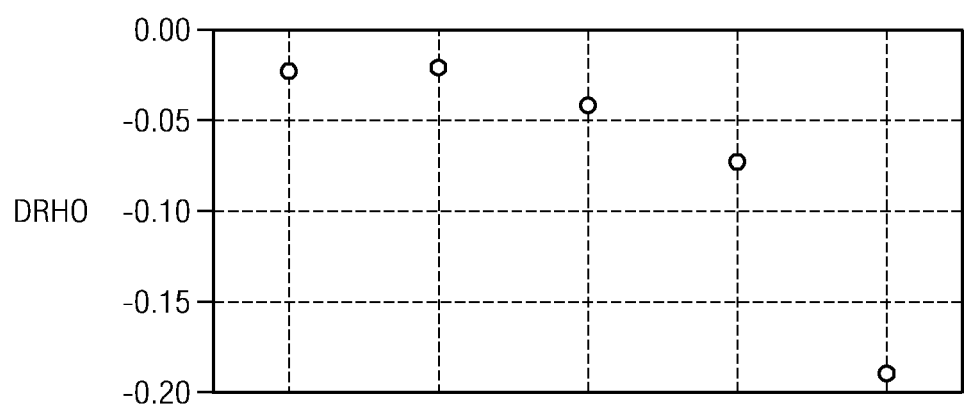
Figure 9D:
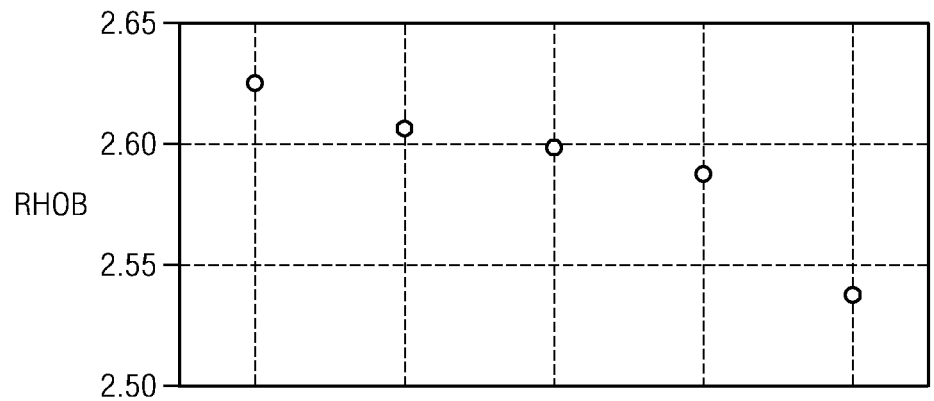
Figure 9E:
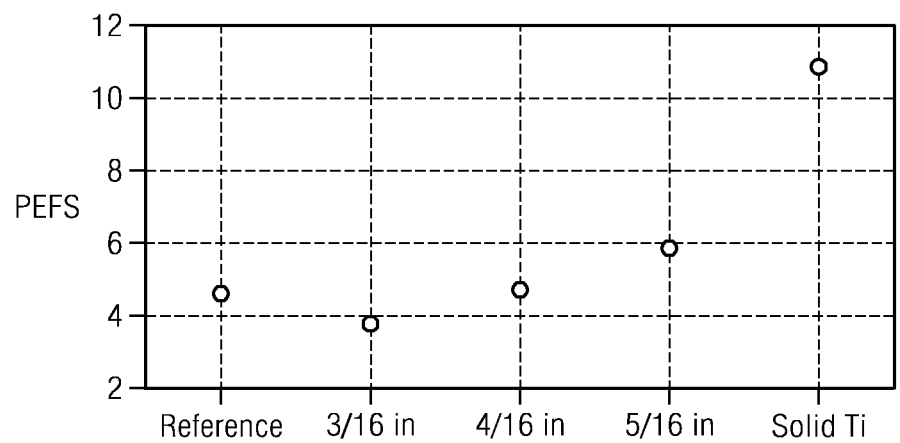
Figure 9F:
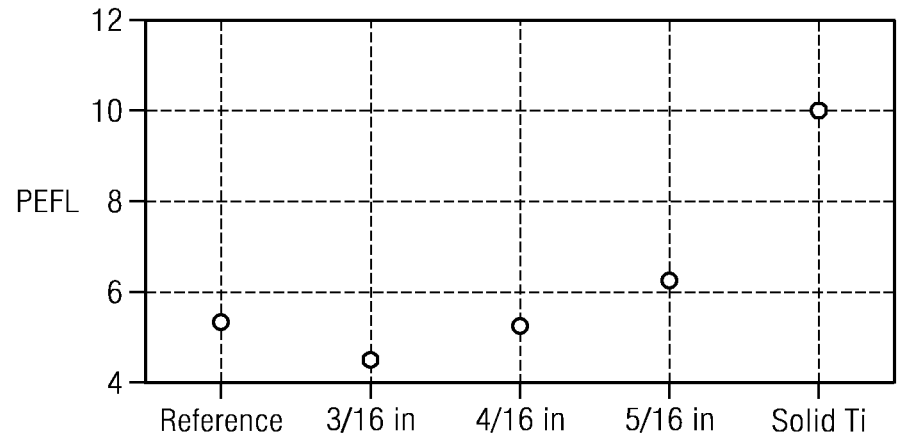
Figure 10A:
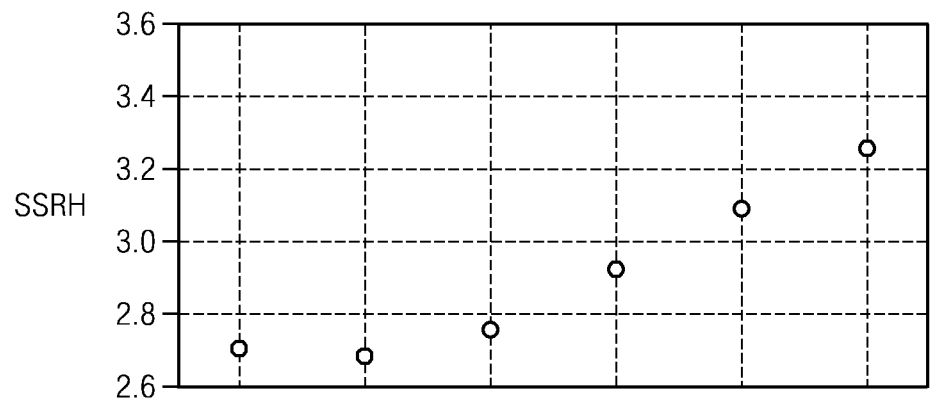
Figure 10B:
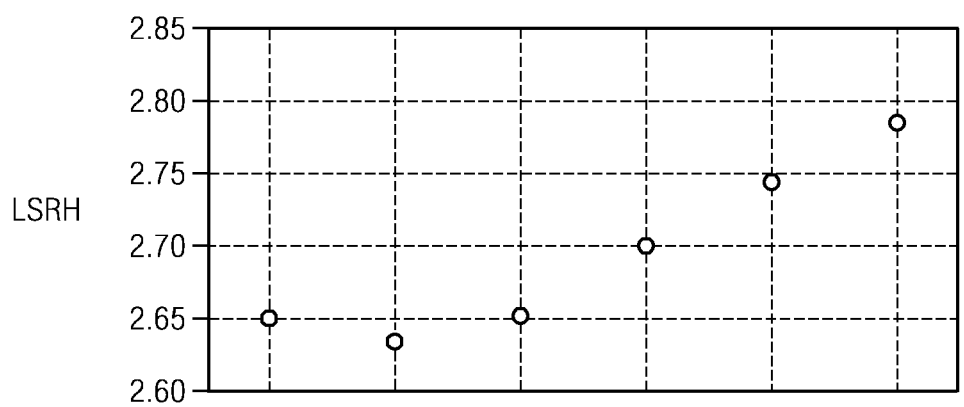
Figure 10C:
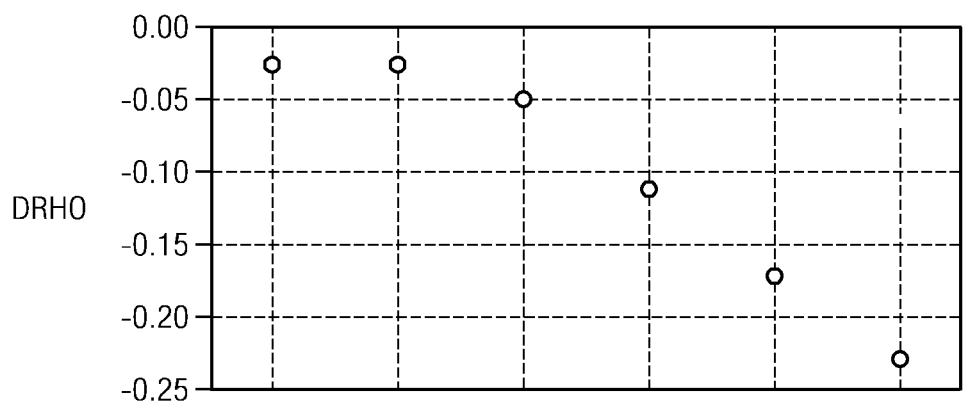
Figure 10D:
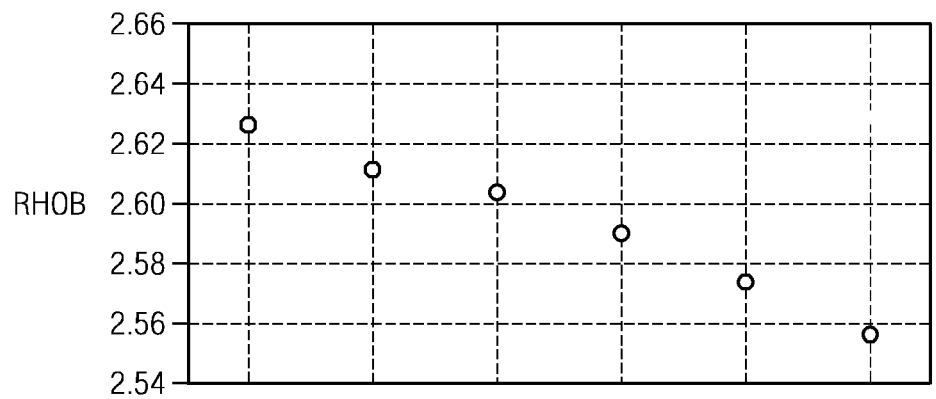
Figure 10E:
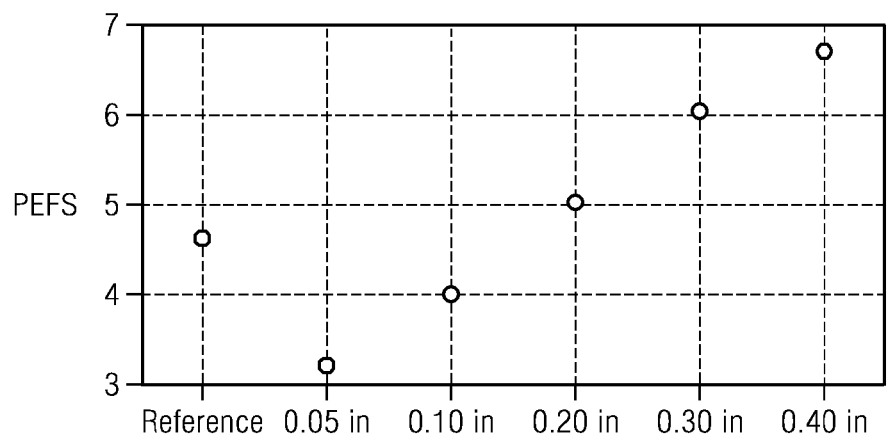
Figure 10F:
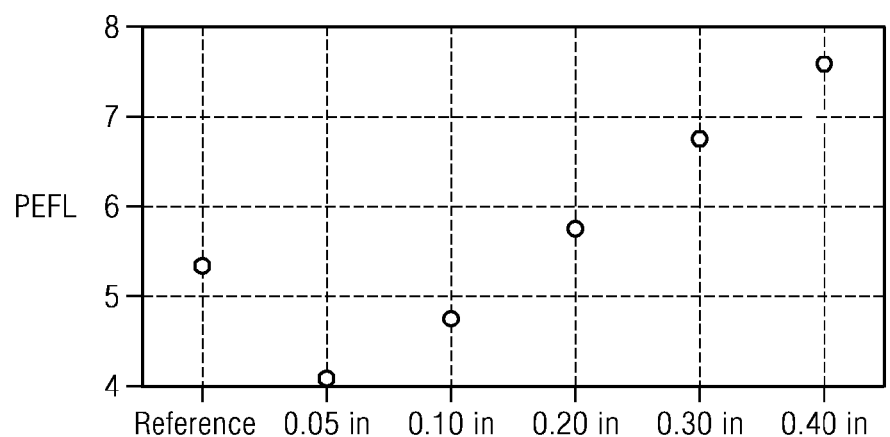

FIGS. 9A-9F illustrate example emulation properties of the example pin array composite materials 320 of FIGS. 3A-3E. Across the x-axis of each of the example graphs of FIGS. 9A-9F are a reference AI 7049-T73 aluminum alloy that is to be emulated, pin diameters of ³⁄₁₆", ⁴⁄₁₆" and ⁵⁄₁₆", and a solid piece of titanium. The example graph of FIG. 9A displays apparent density values measured by the sensor SS and the example graph of FIG. 9B displays apparent density values measured by the sensor LS. FIG. 9D depicts compensated density values computed from the apparent densities of FIGS. 9A and 9B. FIG. 9C shows the differences between the compensated densities of FIG. 9D and the apparent densities of FIG. 9B. FIGS. 9E and 9F are photoelectric factors measured using the sensor SS and the sensor LS, respectively. As shown in FIGS. 9A-9E, a pin diameter of ⁴⁄₁₆" results in properties that substantially match, mimic and/or emulate the reference aluminum alloy. Because in the example of FIGS. 3A-3E a slightly higher photoelectric factor in the range of [5, 6] was desired, a pin diameter of ⁵⁄₁₆" was selected and, thus, the example composite material 320 of FIGS. 3A-3E may be superior to the AI 7049-T73 aluminum alloy it is intended to replace. As the example of FIGS. 9A-F illustrates, one or more materials and/or geometries of a composite material may be selected and/or designed either to mimic and/or emulate one or more properties of another material, and/or to have one or more specific property values. That is, a composite material does not have to be intended to mimic, emulate and/or replace another material but may be designed to have specific and/or desired properties.

FIGS. 10A-10F illustrate example emulation properties for the example composite material geometry of FIGS. 7A and 7B. Across the x-axis of each of the example graphs of FIGS. 10A-10F are the reference AI 7049-T73 aluminum alloy, and thicknesses of the inserted material 705 of 0.05", 0.1", 0.2", 0.3" and 0.4". The same values and/or properties are plotted in FIGS. 10A-10F as in FIGS. 9A-9F, respectively. As shown in FIGS. 10A-10F, an insert thickness of 0.1" to 0.2" yields material properties substantially similar to that of the reference aluminum alloy.

In view of the foregoing description and the figures, it should be clear that the present disclosure introduces composite materials that emulate and/or mimic the properties of other materials, and calibration assemblies using the same. In particular, the present disclosure introduces calibration assemblies for use in calibrating downhole formation evaluation tools including a first body comprising a first material and having a first geometry, a second body comprising a second material formed to receive the first body, wherein the first and second materials and the first geometry are selected so that a calibration property of the calibration assembly substantially matches a corresponding calibration property of a third material.

The present disclosure further introduces methods including selecting first and second materials, selecting a geometry, machining the first material to the geometry to form a first body, machining the second material to form a second body to receive the first body, and assembling the machined first and second bodies to form a composite material, wherein the composite material has a calibration property that substantially matches a corresponding calibration property of a third material, wherein the property comprises at least one of a density of electrons, an effective atomic number or a photoelectric factor, and the third material is different than the first and second materials.

The present disclosure moreover introduces methods including transmitting a signal from a downhole tool, receiving the signal at a sensor of the downhole tool through a composite material formed from two or more other materials through at least one of machining or assembly, wherein the composite material is configured such that the sensor is configured to measure a property of the composite material that is substantially similar to that measured for a calibration material; and, adjusting an output of the sensor based on the measured property of the composite material.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:
1. A calibration assembly apparatus comprising:
   a calibration base having a first geometry;
   a calibration insert comprising a first material and having a second geometry; and a second material being different from the first material and having a third geometry;

wherein the second geometry enables the calibration insert to receive the second material to form a first composite region, wherein the first and second materials and the second and third geometries are selected such that a calibration property of the calibration assembly apparatus substantially matches a corresponding calibration property of a third material.

2. The calibration assembly apparatus of claim 1, wherein the second geometry of the calibration insert comprises an interior surface corresponding to the shape of a downhole tool and enabling the calibration insert to receive the downhole tool.

3. The calibration assembly apparatus of claim 2, wherein the downhole tool comprises at least one of a density tool, a neutron porosity tool, a pulse-neutron tool, a magnetic resonance tool, an acoustic tool, or an electromagnetic tool.

4. The calibration assembly apparatus of claim 2, wherein the first composite region is located on the calibration insert to be in close proximity to a sensor of the downhole tool when the downhole tool is received by the calibration insert.

5. The calibration assembly apparatus of claim 4, wherein the first composite region is dimensioned to extend beyond the dimensions of the sensor to accommodate misalignment of the downhole tool and the calibration insert.

6. The calibration assembly apparatus of claim 1, wherein the second geometry of the calibration insert comprises an exterior surface corresponding to the first geometry of the calibration base, and the first geometry enables the calibration base to receive the calibration insert.

7. The calibration assembly apparatus of claim 1, wherein a second composite region is formed on the calibration insert.

8. The calibration assembly apparatus of claim 7, wherein the second geometry enables the calibration insert to receive the second material at a location different from the first composite region to form the second composite region.

9. The calibration assembly apparatus of claim 7, wherein the second geometry enables the calibration insert to receive a fourth material at a location different from the first composite region to form the second composite region, the fourth material being different from the second material.

10. The calibration assembly apparatus of claim 1, wherein the third geometry of the second material comprises at least one of a cylindrical pin, a rectangular pin, a square pin, a parallel bar, or a rectangular sheet.

11. The calibration assembly apparatus of claim 1, wherein each of the first material and the second material comprises a metal, an alloy, a plastic, a fluid, or a ceramic.

12. The calibration assembly apparatus of claim 1, wherein the first material and the second material are different from the third material.

13. An apparatus for calibrating a formation evaluation tool comprising:
a first body comprising a first material and having a first geometry;
a second body comprising a second material formed to receive the first body; and
a third body comprising a third material formed to receive the second body;
wherein the first and second materials and the first geometry are selected so that a calibration property of the apparatus substantially matches a corresponding calibration property of a fourth material that is different from the first and second materials.

14. The apparatus of claim 13, wherein the first and second materials and the first geometry are selected based at least partially upon a property of a signal used by the formation evaluation tool to evaluate a formation.

15. The apparatus of claim 14, wherein the property of the signal comprises at least one of a wavelength, an energy, a scattering, or an absorption.

16. The apparatus of claim 13, wherein the corresponding calibration property of the fourth material comprises at least one of a density of electrons, an effective atomic number, or a photoelectric factor.

17. The apparatus of claim 13, wherein the second body has a second geometry enabling the second body to receive the formation evaluation tool, and wherein the location on the second body in which the first body is received forms a composite region that is located in close proximity to a sensor of the formation evaluation tool when the formation evaluation tool is received by the second body.

18. A method, comprising:
transmitting a signal from a downhole tool;
receiving the signal at a sensor of the downhole tool through a composite material formed from two or more other materials through at least one of machining or assembly, wherein the composite material is configured such that the sensor is configured to measure a property of the composite material that is substantially similar to that measured for a calibration material, wherein the composite material comprises a plurality of pins comprising a first material inserted into a body comprising a second material different from the first material, the plurality of pins arranged in a rectangular array; and
adjusting an output of the sensor based on the measured property of the composite material.

19. The method of claim 18, wherein the property is at least one of a density or a photoelectric factor.

20. The method of claim 18, wherein the first material comprises titanium and the second material comprises aluminum.

* * * * *